US006975781B2

(12) United States Patent
Takiguchi et al.

(10) Patent No.: US 6,975,781 B2
(45) Date of Patent: Dec. 13, 2005

(54) CHARACTERISTIC ADJUSTMENT METHOD OF MULTISTAGE MACH-ZEHNDER INTERFEROMETER TYPE OPTICAL CIRCUIT AND MULTISTAGE MACH-ZEHNDER INTERFEROMETER TYPE OPTICAL CIRCUIT

(75) Inventors: Koichi Takiguchi, Atsugi (JP); Senichi Suzuki, Higashinaruse Isehara (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 209 days.

(21) Appl. No.: 10/614,637

(22) Filed: Jul. 7, 2003

(65) Prior Publication Data

US 2004/0022493 A1 Feb. 5, 2004

(30) Foreign Application Priority Data

Jul. 10, 2002 (JP) ........................................ 2002-201059

(51) Int. Cl.[7] .............................................. G02F 1/035
(52) U.S. Cl. ................................ 385/3; 385/1; 356/479; 359/279
(58) Field of Search ......................... 385/1–10; 356/477, 356/479; 359/279; 398/188

(56) References Cited

U.S. PATENT DOCUMENTS 5,572,611 A * 11/1996 Jinguji et al. .................. 385/17
5,596,661 A    1/1997 Henry et al.

FOREIGN PATENT DOCUMENTS

JP          7209090         11/1995

OTHER PUBLICATIONS

Offrein, B. J., et al., "Adaptive Gain Equalizer in High-Index-Constrast SiON Technology," *IEEE Photonics Technology Letters*, IEEE Inc., New York, US, vol. 12, No. 5, May 2000, pp. 504–506.
Wacogne, B., et al., "Double Security Level in Telecommunication System Based on Phase Coding and False Data Transmission," *Journal of Lightwave Technology*, IEEE, New York, US, vol. 14, No. 5, May 1996, pp. 665–670.

Takiguchi, K., et al., "Variable Group–Delay Dispersion Equalizer Using Lattice–Form Programmable Optical Filter on Planar Lightwave Circuit," *IEEE Journal of Selected Topics in Quantum Electronics*, IEEE Service Center, US, vol. 2, No. 2, Jun. 1996, pp. 270–276.
Takada, K., et al., "Measurement of phase error distributions in silica–based arrayed–waveguide grating multiplexers by using Fourier transform spectroscopy," *Electronic Letters*, IEE Stevenage, GB, vol. 30, No. 20, Sep. 29, 1994, pp. 1671–1672.
Koichi Takiguchi et al., *Planar Lightwave Circuit Optical Dispersion Equalizer*, IEEE Photonics Technology Letters, vol. 6, No. 1, Jan. 1994, pp. 86–88.
S. Suzuki et al., *Low–Loss Integrated–Optic Dynamic Chromatic Dispersion Compensators Using Lattice–Form Planar Lightwave Circuits*, Tuesday Afternoon, vol. 1, OFC 2003, pp. 176–177.
K. Takiguchi et al., *Method for Adjusting Lattice–Form Optical Devices and Its Use in Realising Low–Loss Variable Chromatic Dispersion Compensator*, Electronics Letters, vol. 39, No. 4, Feb. 20, 2003.

* cited by examiner

*Primary Examiner*—Sung Pak
(74) *Attorney, Agent, or Firm*—Workman Nydegger

(57) ABSTRACT

A multistage Mach-Zehnder interferometer type optical circuit including any number of symmetrical Mach-Zehnder interferometers and any number of asymmetrical Mach-Zehnder interferometers connected in cascade. In the optical circuit, low coherence light is used first to obtain individual phase control conditions of the symmetrical Mach-Zehnder interferometers without being affected by the asymmetrical Mach-Zehnder interferometers. Second, phase control conditions of the individual asymmetrical Mach-Zehnder interferometers are obtained by controlling the symmetrical Mach-Zehnder interferometers based on the first phase control conditions. Finally, the characteristic adjustment of the whole multistage Mach-Zehnder interferometer type optical circuit is carried out by controlling all the interferometers based on the phase control conditions of both the symmetrical Mach-Zehnder interferometers and asymmetrical Mach-Zehnder interferometers and setting the phase shift amounts of the individual interferometers at appropriate values.

18 Claims, 8 Drawing Sheets

1

CHARACTERISTIC ADJUSTMENT METHOD OF MULTISTAGE MACH-ZEHNDER INTERFEROMETER TYPE OPTICAL CIRCUIT AND MULTISTAGE MACH-ZEHNDER INTERFEROMETER TYPE OPTICAL CIRCUIT

This application claims priority from Japanese Patent Application No. 2002-201059 filed Jul. 10, 2002, which is incorporated hereinto by reference.

BACKGROUND OF THE INVENTION

1. Field of the Invention

The present invention relates to an adjustment method of characteristics of a multistage Mach-Zehnder interferometer type optical circuit, and to a multistage Mach-Zehnder interferometer type optical circuit whose characteristics are adjusted by the same method.

2. Description of the Related Art

As a means for transmitting large amounts of information, a WDM (Wavelength Division Multiplexing) communication system in an optical region is widely used. In the WDM communication system, a multistage Mach-Zehnder interferometer type optical circuit including symmetrical Mach-Zehnder interferometers or asymmetrical Mach-Zehnder interferometers, or both of them, connected in cascade is used as a device capable of implementing a characteristic variable wavelength filter, dispersion compensator, gain equalizer and the like.

To achieve desired characteristics in the multistage Mach-Zehnder interferometer type optical circuit, it is necessary to set the optical path length difference between individual interferometers accurately on an order less than the wavelength of the optical signal. However, the optical path length difference can deviate from a design value because of errors in the fabrication process, thereby often causing a phase error. As a means for compensating for the phase error, phase controllers for controlling the refractive indices of the individual interferometers are provided so that they carry out the phase control of the optical signal in the interferometers by controlling the refractive indices. Accordingly, it is necessary to measure phase characteristics of the individual interferometers before carrying out the control by the phase controllers. An adjustment method of the characteristics of the multistage Mach-Zehnder interferometer type optical circuit will be described with reference to FIGS. 1 and 2.

FIG. 1 is a diagram illustrating a conventional adjustment method of the characteristics of the multistage Mach-Zehnder interferometer type optical circuit, and FIG. 2 is a graph illustrating an intensity characteristic of the optical output when changing phase ϕ by using the phase controllers in symmetrical Mach-Zehnder interferometers.

FIG. 1 is a schematic diagram of a typical configuration of the multistage Mach-Zehnder interferometer type optical circuit including symmetrical Mach-Zehnder interferometers and asymmetrical Mach-Zehnder interferometers alternately connected in cascade.

More specifically, each symmetrical Mach-Zehnder interferometer comprises a directional coupler $21_1$ placed forward for splitting/combining the optical signal; a directional coupler $21_2$ placed backward for splitting/combining the optical signal; two optical waveguides placed between the directional couplers $21_1$ and $21_2$ and adjusted such that they have the same optical path lengths; and a phase controller $22_1$ attached to one of the two optical waveguides between the directional couplers $21_1$ and $21_2$ to control the phase of the optical signal. On the other hand, each asymmetrical Mach-Zehnder interferometer comprises a directional coupler $21_2$ placed forward for splitting/combining the optical signal; a directional coupler $21_3$ placed backward for splitting/combining the optical signal; two optical waveguides placed between the directional couplers $21_2$ and $21_3$ and adjusted such that they have different optical path lengths; and a phase controller $22_2$ attached to one of the two optical waveguides between the directional couplers $21_2$ and $21_3$ to control the phase of the optical signal. The multistage Mach-Zehnder interferometer type optical circuit includes the symmetrical Mach-Zehnder interferometers and asymmetrical Mach-Zehnder interferometers with the foregoing structures connected in cascade alternately with sharing the directional coupler $21_2$. In addition, at the initial end of the multistage Mach-Zehnder interferometer type optical circuit, there are provided optical waveguides $24_1$ and $24_2$ as an input section of the optical signal.

Since the multistage Mach-Zehnder interferometer type optical circuit has a multi-stage configuration that connects the foregoing symmetrical Mach-Zehnder interferometers and asymmetrical Mach-Zehnder interferometers alternately in cascade, FIG. 1 designates the directional couplers by reference numerals $21_1$–$21_M$, and the phase controllers by $22_1$–$22_L$. In addition, it designates monitoring ports by reference numerals $23_1$–$23_4$, an interferometer to be measured by 25, and interferometers section including the monitoring ports by 26. Although the directional couplers $21_1$–$21_M$ are illustrated by a single line, they actually include two optical waveguides placed in parallel with appropriate proximity.

The conventional method of adjusting the characteristics of the multistage Mach-Zehnder interferometer type optical circuit with the foregoing configuration is carried out as follows. It provides the circuit with monitoring ports in close proximity at forward and backward stages of the interferometer to be measured just as the interferometers section 26 equipped with the monitoring ports $23_1$–$23_4$ as shown in FIG. 1 (K. Takiguchi et al., IEEE PHOTONICS TECHNOLOGY LETTERS, VOL. 6, NO. 1, pp. 86–88 (1994)). For example, to adjust the characteristics of the interferometer 25 to be measured, the optical signal is input from the monitoring port $23_1$ or $23_2$ installed at a forward stage of the interferometer 25 to be measured. Then, while changing the phase of the optical waveguide with the phase controller $22_{J-1}$ of the interferometer 25 to be measured, intensity changes of the output light from the monitoring port $23_3$ or $23_4$, which is installed at a backward stage of the interferometer 25 to be measured, are measured. Incidentally, the individual monitoring ports $23_1$–$23_4$ are connected to the forward and backward stages of the interferometer 25 to be measured by the directional couplers $21_{K-5}$, $21_{K-4}$, $21_{K+1}$, and $21_{K+2}$, respectively. In addition, directional couplers $21_{K-2}$ and $21_{K-1}$ in the interferometer 25 to be measured are provided for connecting other monitoring ports for other interferometers to be measured at the forward or backward stage.

Across the monitoring ports $23_1$ and $23_3$ provided for the interferometer 25 to be measured, a symmetrical Mach-Zehnder interferometer is configured with two optical waveguides having the same optical path lengths. The intensity in the output light changes in response to the phase change ϕ by the phase controller $22_{J-1}$ as illustrated in FIG. 2. Accordingly, measuring the intensity changes makes it possible to know the driving amount (corresponding to a phase control signal) of the phase controller $22_{J-1}$ of the interferometer 25 to be measured, and to provide the phase of the optical signal with desired characteristics by setting an appropriate driving amount to the phase controller $22_{J-1}$. The graph of FIG. 2, illustrating the phase-output light intensity normalizes the intensity by the maximum intensity under the assumption that the coupling ratio of the directional couplers $21_{K-3}$ and $21_K$ is 50% (3 dB directional coupler).

FIG. 1 shows a configuration in which only the interferometers section 26 has the monitoring ports $23_1$–$23_4$ to make the difference clear between the section with the monitoring ports and sections without using them. In actuality, however, monitoring ports are provided to the forward and backward stages of all the interferometers except for the interferometers at both ends constituting input and output sections of the multistage Mach-Zehnder interferometer type optical circuit, so that the other interferometers are also subjected to the measurement of the phase characteristics and the adjustment of the phases using the same procedure. The interferometers at both ends of the multistage Mach-Zehnder interferometer type optical circuit constituting its input and output sections can use the optical waveguides constituting the input ports or output ports as the monitoring ports, thereby obviating the need to install the monitoring ports.

The conventional characteristic adjustment method, however, has the following problems because the multistage Mach-Zehnder interferometer type optical circuit must include the monitoring ports in close proximity in the forward and backward stages of the interferometers. (1) Installation of the monitoring ports increases the dimensions of the device; and (2) A device loss is increased because of the leakage of light to the monitoring ports.

SUMMARY OF THE INVENTION

The present invention is implemented to solve the foregoing problems. It is therefore an object of the present invention to provide a method of accurately and simply adjusting the characteristics of the multistage Mach-Zehnder interferometer type optical circuit without installing any monitoring ports, and a multistage Mach-Zehnder interferometer type optical circuit whose characteristics are adjusted by the adjustment method.

To accomplish the object of the present invention, according to a first aspect of the present invention, there is provided an adjustment method of characteristics of a multistage Mach-Zehnder interferometer type optical circuit that includes: a first input/output optical waveguide pair; a second input/output optical waveguide pair; M directional couplers disposed between the first and second input/output optical waveguide pairs, where M is an integer equal to or greater than two; and (M−1) phase control means, each of which is disposed between two adjacent directional couplers of the M directional couplers, is attached to at least one of two optical waveguides of the optical waveguide pair placed between the adjacent directional couplers, and controls relative phase of light beams passing through a first optical waveguide and a second optical waveguide of the optical waveguide pair in response to a phase control signal, wherein the adjacent directional couplers, the phase control means disposed between the adjacent directional couplers, and the optical waveguide pairs that are disposed between the directional couplers and have same optical path lengths constitute symmetrical Mach-Zehnder type optical interferometers, whereas the adjacent directional couplers, the phase control means disposed between the adjacent directional couplers, and the optical waveguide pairs that are disposed between the directional couplers and have different optical path lengths constitute asymmetrical Mach-Zehnder type optical interferometers, and (M−1) Mach-Zehnder type optical interferometers are connected in cascade to construct the multistage Mach-Zehnder interferometer type optical circuit, the adjustment method of the characteristics of the multistage Mach-Zehnder interferometer type optical circuit comprising: a first step of sequentially carrying out, for each of the symmetrical Mach-Zehnder interferometers, setting of the phase control signal besed on a correlation between the phase control signal of the phase control means disposed in the symmetrical Mach-Zehnder interferometer and optical intensity output from a first optical waveguide of the second input/output optical waveguide pair disposed in an output side of the multistage Mach-Zehnder interferometer type optical circuit, after inputting low coherence light, which has a coherence length shorter than a minimum optical path length difference between the asymmetrical Mach-Zehnder interferometers, from a first optical waveguide of the first input/output optical waveguide pair disposed at an input side of the multistage Mach-Zehnder interferometer type optical circuit; a second step of sequentially carrying out, for each of the asymmetrical Mach-Zehnder interferometers, setting of the phase control signal based on a correlation between the phase control signal of the phase control means disposed in the asymmetrical Mach-Zehnder interferometer and optical intensity output from one of first and second optical waveguides of the second input/output optical waveguide pair disposed in the output side of the multistage Mach-Zehnder interferometer type optical circuit, after inputting wavelength tunable coherent light from one of first and second optical waveguides of the first input/output optical waveguide pair disposed at the input side of the multistage Mach-Zehnder interferometer type optical circuit; and a third step of optimizing the individual phase control signals of the phase control means to achieve a desired characteristic of the output light from the multistage Mach-Zehnder interferometer type optical circuit based on the correlations between the phase control signals and output light intensity obtained at the first step and the second step.

According to a second aspect of the present invention, there is provided an adjustment method of characteristics of a multistage Mach-Zehnder interferometer type optical circuit that includes: a first input/output optical waveguide pair; a second input/output optical waveguide pair; 2(N+1) directional couplers disposed between the first and second input/output optical waveguide pairs, where N is an integer equal to or greater than one; and (2N+1) phase control means, each of which is disposed between two adjacent directional couplers of the 2(N+1) directional couplers, is attached to at least one of two optical waveguides of the optical waveguide pair placed between the adjacent directional couplers, and controls relative phase of light beams passing through a first optical waveguide and a second optical waveguide of the optical waveguide pair in response to a phase control signal, wherein the adjacent directional couplers, the phase control means disposed between the adjacent directional couplers, and the optical waveguide pairs that are disposed between the directional couplers and have same optical path lengths constitute symmetrical Mach-Zehnder type optical interferometers, whereas the adjacent directional couplers, the phase control means disposed between the adjacent directional couplers, and the optical waveguide pairs that are disposed between the directional couplers and have different optical path lengths constitute asymmetrical Mach-Zehnder type optical interferometers, and the (N+1) symmetrical Mach-Zehnder type optical interferometers and the N asymmetrical Mach-Zehnder type optical interferometers are alternately connected in cascade to construct the multistage Mach-Zehnder interferometer type optical circuit, the adjustment method of the characteristics of the multistage Mach-Zehnder interferometer type optical circuit comprising: a first step of sequentially carrying out, for each of the symmetrical Mach-Zehnder interferometers, setting of the phase control signal based on a correlation between the phase control signal of the phase control means disposed in the symmetrical Mach-Zehnder interferometer and optical intensity output from a first optical waveguide of the second input/output optical waveguide pair disposed in an output side of the multistage Mach-Zehnder interferometer type optical circuit, after inputting low coherence light, which has a coherence length shorter than a minimum optical path length difference between the asymmetrical Mach-Zehnder interferometers, from a first optical waveguide of the first input/output optical waveguide pair disposed at an input side of the multistage Mach-Zehnder interferometer type optical circuit; a second step of sequentially carrying out, for each of the asymmetrical Mach-Zehnder interferometers, setting of the phase control signal based on a correlation between the phase control signal of the phase control means disposed in the asymmetrical Mach-Zehnder interferometer and optical intensity output from one of first and second optical waveguides of the second input/output optical waveguide pair disposed in the output side of the multistage Mach-Zehnder interferometer type optical circuit, after inputting wavelength tunable coherent light from one of first and second optical waveguides of the first input/output optical waveguide pair disposed at the input side of the multistage Mach-Zehnder interferometer type optical circuit; and a third step of optimizing the individual phase control signals of the phase control means to achieve a desired characteristic of the output light from the multistage Mach-Zehnder interferometer type optical circuit based on the correlations between the phase control signals and output light intensity obtained at the first step and the second step.

In the first and second aspects of the adjustment method of the characteristics of the multistage Mach-Zehnder interferometer type optical circuit, the setting of each of the phase control signals at the first step may be carried out in response to the optical output intensity from the first optical waveguide of the second input/output optical waveguide pair such that the phase control signal of the phase control means disposed in the symmetrical Mach-Zehnder interferometer makes an intensity-coupling ratio of the symmetrical Mach-Zehnder interferometer equal to one of 0% and 100%; and the setting of each of the phase control signals at the second step may be carried out such that an intensity-coupling ratio of two of the symmetrical Mach-Zehnder interferometers adjacent to both ends of each of the asymmetrical Mach-Zehnder interferometers becomes 50%, and intensity-coupling ratios of the symmetrical Mach-Zehnder interferometers other than the two symmetrical Mach-Zehnder interferometers become one of 0% and 100%, by setting the phase control signals of the phase control means disposed in the symmetrical Mach-Zehnder interferometers based on the correlations obtained at the first step, and such that intensity-coupling ratios of the asymmetrical Mach-Zehnder interferometers become one of 0% and 100%.

In the first and second aspects of the adjustment method of the characteristics of the multistage Mach-Zehnder interferometer type optical circuit, the settings of the phase control signals at the first step and the second step may be each carried out sequentially from the phase control means disposed in the output side of the multistage Mach-Zehnder interferometer type optical circuit toward the phase control means disposed in the input side of the multistage Mach-Zehnder interferometer type optical circuit.

In the first and second aspects of the adjustment method of the characteristics of the multistage Mach-Zehnder interferometer type optical circuit, an optical input to the multistage Mach-Zehnder interferometer type optical circuit at the first step and the second step may be carried out by using optical path switching means including two optical input sections and two optical output sections and capable of selecting an optical path between the optical input sections and the optical output sections, in which the two optical input sections are connected to the low coherence light and the wavelength tunable coherent light, respectively, the two optical output sections are connected to the first input/output optical waveguide pair, and the optical path switching means carry out optical path switching to select one of the low coherence light and the wavelength tunable coherent light as the input light.

In addition, the characteristic adjustment by using the foregoing methods can provide a low-loss multistage Mach-Zehnder interferometer type optical circuit without the monitoring ports.

According to the present invention, it becomes unnecessary to install the monitoring ports (monitoring circuits). Consequently, the problem of increasing the device size or optical signal loss can be eliminated. In addition, since the phase shift values can be set accurately, fabrication errors can be corrected easily, thereby enabling the precise phase setting of the complicated multistage Mach-Zehnder interferometer type optical circuit.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The invention will now be described with reference to the accompanying drawings.

Figure 3:
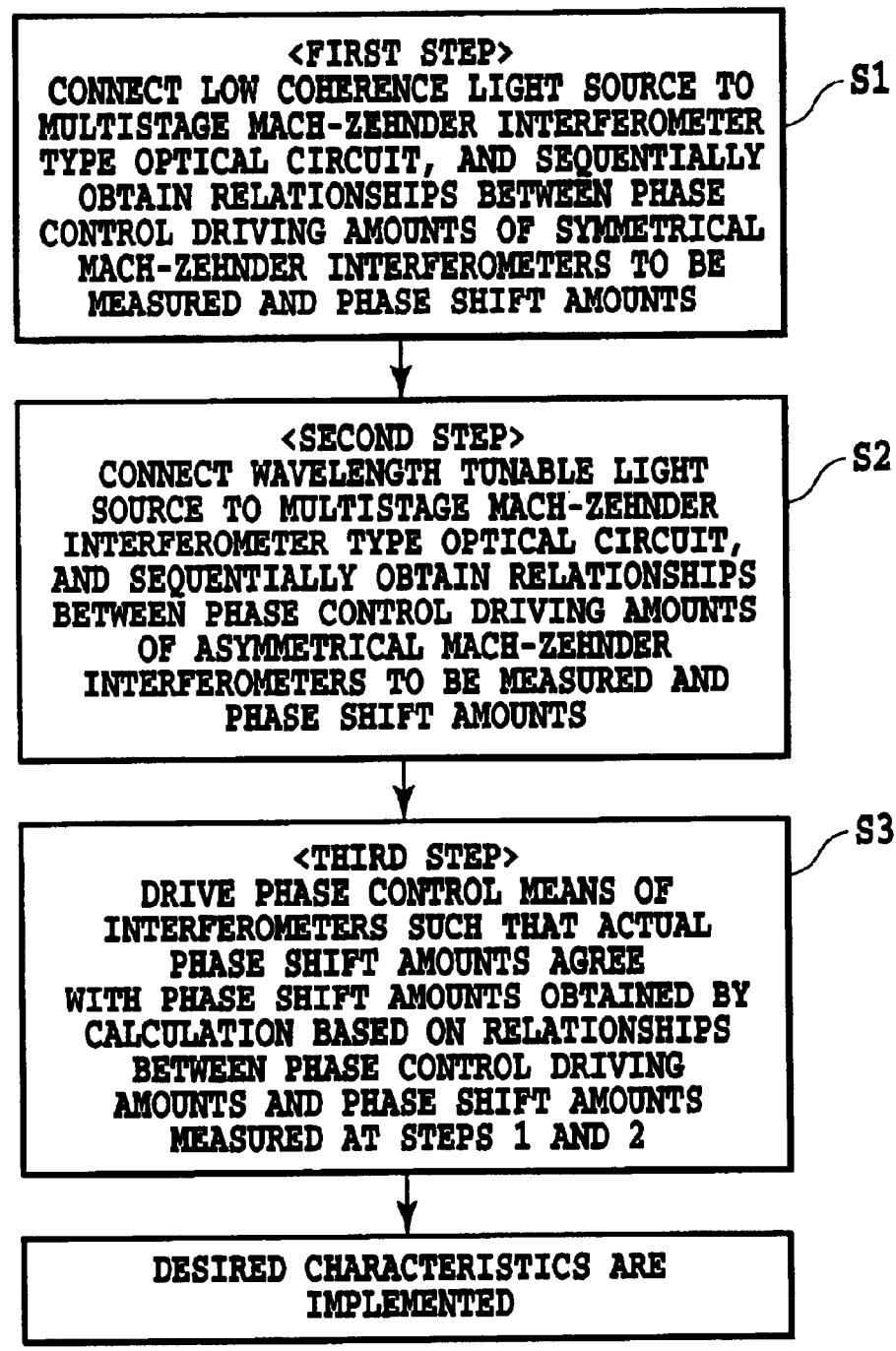
FIG. 3 is a flowchart illustrating an adjustment method of the characteristics of the multistage Mach-Zehnder interferometer type optical circuit as an embodiment in accordance with the present invention.
Figure 4:
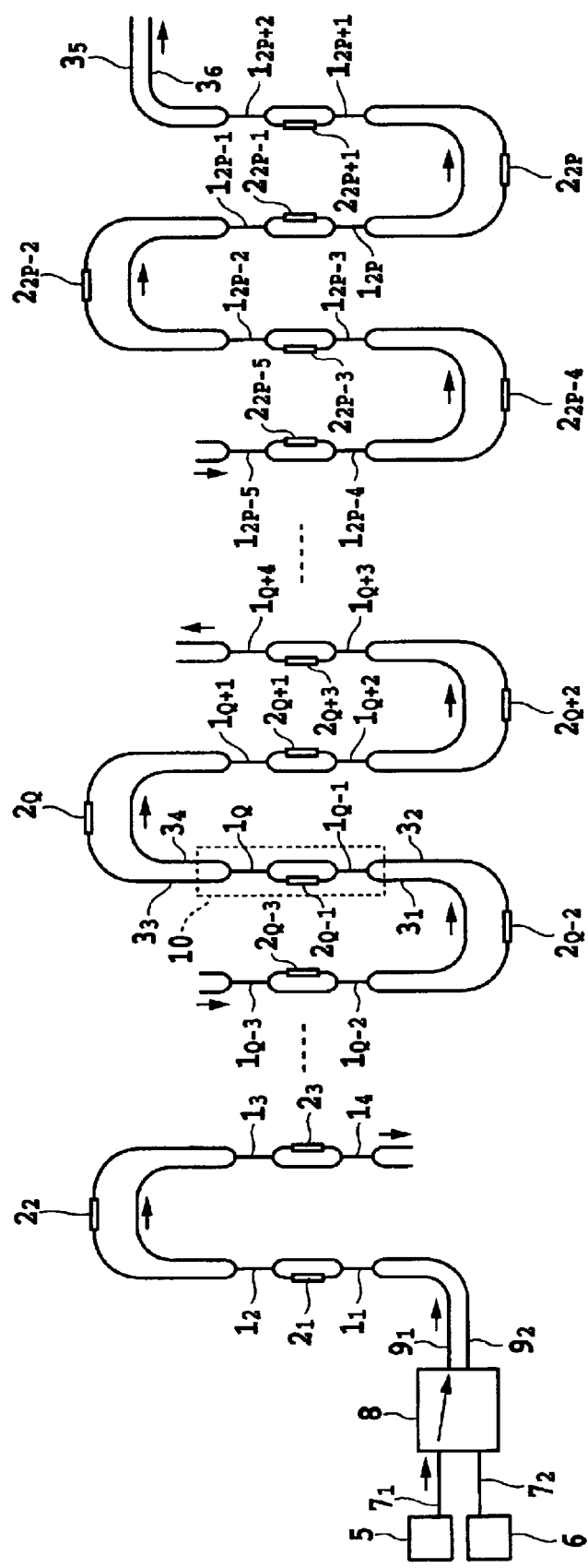
FIG. 4 is a schematic diagram of a multistage Mach-Zehnder interferometer type optical circuit for explaining the procedure of step S1 in FIG. 3.
Figure 5:
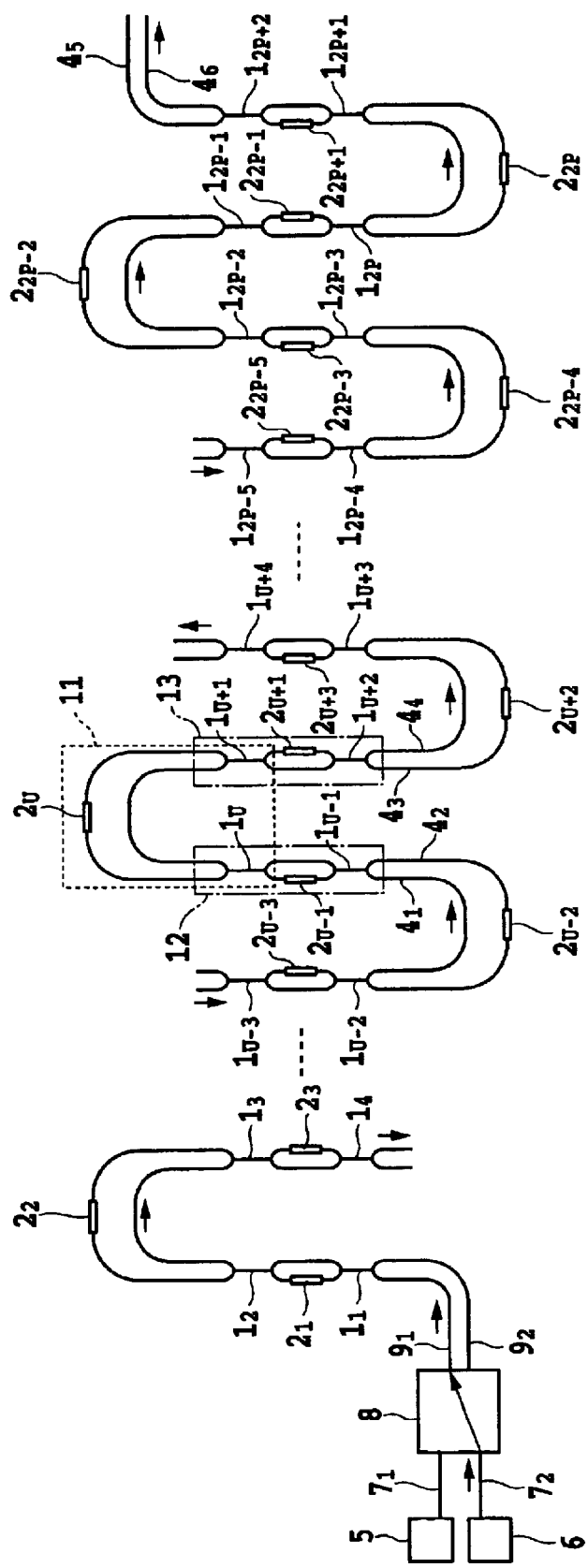
FIG. 5 is a schematic diagram of the multistage Mach-Zehnder interferometer type optical circuit for explaining the procedure of step S2 in FIG. 3.

FIG. 3 is a flowchart illustrating an adjustment method of the characteristics of a multistage Mach-Zehnder interferometer type optical circuit as an embodiment in accordance with the present invention; FIG. 4 is a schematic diagram of the multistage Mach-Zehnder interferometer type optical circuit for explaining a first procedure of FIG. 3; and FIG. 5 is a schematic diagram of the multistage Mach-Zehnder interferometer type optical circuit for explaining a second procedure of FIG. 3. The adjustment method of the characteristics of the multistage Mach-Zehnder interferometer type optical circuit shown in FIG. 3 will now be described with reference to the multistage Mach-Zehnder interferometer type optical circuit shown in FIGS. 4 and 5. The multistage Mach-Zehnder interferometer type optical circuit with the configuration shown in FIGS. 4 and 5 is the most generally used typical example. It includes (P+1) symmetrical Mach-Zehnder interferometers and P asymmetrical Mach-Zehnder interferometers alternately connected in cascade, with the symmetrical Mach-Zehnder interferometers being placed at the initial and final ends. In addition, one of the two optical waveguides of the individual interferometers is provided with a phase controller for controlling the phase of the optical signal. Although the details will be described later, the present invention is not limited to the multistage Mach-Zehnder interferometer type optical circuit with the foregoing configuration. For example, it is also applicable to a multistage Mach-Zehnder interferometer type optical circuit in which any numbers of the symmetrical Mach-Zehnder interferometers and asymmetrical Mach-Zehnder interferometers are connected in an arbitrary order.

A concrete configuration of the multistage Mach-Zehnder interferometer type optical circuit shown in FIGS. 4 and 5 is as follows. The symmetrical Mach-Zehnder interferometer comprises a directional coupler $1_1$ placed forward for splitting/combining an optical signal; a directional coupler $1_2$ placed backward for splitting/combining the optical signal; two optical waveguides (arms) that are interposed between the directional couplers $1_1$ and $1_2$ and have the same optical path lengths; and a phase control means $2_1$ attached to one of the two optical waveguides (arms) interposed between the directional couplers $1_1$ and $1_2$ to control the phase of the optical signal. On the other hand, the asymmetrical Mach-Zehnder interferometer comprises the directional coupler $1_2$ placed forward for splitting/combining the optical signal; a directional coupler $1_3$ placed backward for splitting/combining the optical signal; two optical waveguides (arms) that are interposed between the directional couplers $1_2$ and $1_3$ and have different optical path lengths; and a phase control means $2_2$ attached to one of the two optical waveguides (arms) interposed between the directional couplers $1_2$ and $1_3$. The symmetrical Mach-Zehnder interferometers and asymmetrical Mach-Zehnder interferometers are alternately connected in cascade with sharing the directional coupler $1_2$, thereby constituting the multistage Mach-Zehnder interferometer type optical circuit. In addition, at the initial stage of the multistage Mach-Zehnder interferometer type optical circuit, optical waveguides $9_1$ and $9_2$ are installed which constitute an input section of the optical signal.

Since the multistage Mach-Zehnder interferometer type optical circuit has the multi-stage configuration that alternately connects the symmetrical Mach-Zehnder interferometers and asymmetrical Mach-Zehnder interferometers in cascade, FIGS. 4 and 5 designate the directional couplers by reference numerals $1_1$–$1_{2P+2}$, the phase controllers by $2_1$–$2_{2P+1}$, ports by $3_1$–$3_6$ and $4_1$–$4_6$, respectively and the interferometer to be measured by 10 abd 11, respectively. Although the directional couplers $1_1$–$1_{2P+2}$ are each illustrated by a single line for simplicity, they actually include two optical waveguides placed in parallel with appropriate proximity.

A general description of the configuration of the multistage Mach-Zehnder interferometer type optical circuit shown in FIGS. 4 and 5 will be as follows. Specifically, the optical circuit comprises two optical waveguides, and 2(P+1) directional couplers at which the two optical waveguides are placed in close proximity, where P is an integer equal to or greater than one. In addition, at (2P+1) sections between the 2(P+1) directional couplers, (P+1) pairs of optical waveguides with the same optical path lengths and P pairs of optical waveguides with different optical path lengths are disposed alternately, with two pairs of the optical waveguides with the same optical path lengths being placed at both ends.

Furthermore, a phase controller for controlling the phase of the optical signal is attached to at least one of the optical waveguides of each of the (P+1) pairs of the optical waveguides with the same optical path lengths, and to at least one of the optical waveguides of each of the P pairs of optical waveguides with different optical path lengths. Here, the two optical waveguides with the same optical path lengths, which include the phase controller mounted on at least one of the optical waveguides, constitute a symmetrical Mach-Zehnder interferometer. On the other hand, the two optical waveguides with the different optical path lengths, which include the phase controller mounted on at least one of the optical waveguides, constitute an asymmetrical Mach-Zehnder interferometer.

Thus, the multistage Mach-Zehnder interferometer type optical circuit shown in FIGS. 4 and 5 includes (P+1) symmetrical Mach-Zehnder interferometers and P asymmetrical Mach-Zehnder interferometers connected alternately in cascade, with two of the symmetrical Mach-Zehnder interferometers being placed at both ends.

The adjustment of the characteristics of the multistage Mach-Zehnder interferometer type optical circuit is carried out as follows by the method in accordance with the present invention. First, a low coherence light source 5 for outputting low coherence light and a wavelength tunable light source 6 for outputting wavelength tunable coherent light are connected to an optical switch 8 via two connection ports $7_1$ and $7_2$. The optical switch 8 makes optical switching to guide one of the output light beams fed from the low coherence light source 5 and wavelength tunable light source 6 to the multistage Mach-Zehnder interferometer type optical circuit. The light the optical switch 8 selects is led to the multistage Mach-Zehnder interferometer type optical circuit via one of two optical waveguides $9_1$ and $9_2$ connected to the output side of the optical switch 8.

Next, referring to FIGS. 3–5, a procedure of the adjustment method of the characteristics of the multistage Mach-Zehnder interferometer type optical circuit in accordance with the present invention will be described. The following description is made under the assumption that the multistage Mach-Zehnder interferometer type optical circuit uses silica based glass as a material of the optical waveguides.

First, the procedure of step S1 shown in FIG. 3 will be described with reference to FIG. 4. At step S1, only the low coherence light source 5 is connected to the optical waveguide $9_1$ of the multistage Mach-Zehnder interferometer type optical circuit through the optical switch 8. Here, the low coherence light source 5 must have a spectrum width with its coherence length shorter than the minimum optical path length difference between the two optical waveguides of any asymmetrical Mach-Zehnder interferometer. As the low coherence light source, it is possible to use a light emitting diode (LED), a super luminescent diode (SLD), the amplified spontaneous emission light (ASE light source) of a rare earth doped optical fiber amplifier or semiconductor laser amplifier, or the like.

The coherence length $L_c$ of the light source is given by the following equation under the assumption that the profile of the spectrum of the light source is Gaussian. The coherence length is defined as a maximum optical path length difference that causes interference, when light is split into two portions, transmitted through different optical path lengths, and combined again.

$$L_c = \lambda_0^2 / \Delta\lambda \qquad (1)$$

where $\lambda_0$ is the center wavelength of the light source, and $\Delta\lambda$ is the full width at half maximum of the spectrum of the light source. For example, when an SLD is used as the low coherence light source, $\lambda_0=1550$ nm and $\Delta\lambda=50$ nm or so, and $L_c$ is about 48.1 μm.

In addition, the optical path length difference $\Delta L$ of the asymmetrical Mach-Zehnder interferometer is given by the following equation.

$$\Delta L = c / (n \times f_{FSR}) \qquad (2)$$

where c is the speed of light in a vacuum, n is an effective refractive index of the optical waveguides, and $f_{FSR}$ is an FSR (Free Spectrum Range). Considering that optical filters for WDM communications are usually used in the FSR on the order of a few tens to several hundred gigahertz, the value $\Delta L$ becomes several hundred micrometers to a few tens of millimeters when assuming the structure of the optical waveguides is made of the silica based glass, where n is about 1.5.

Figure 1:
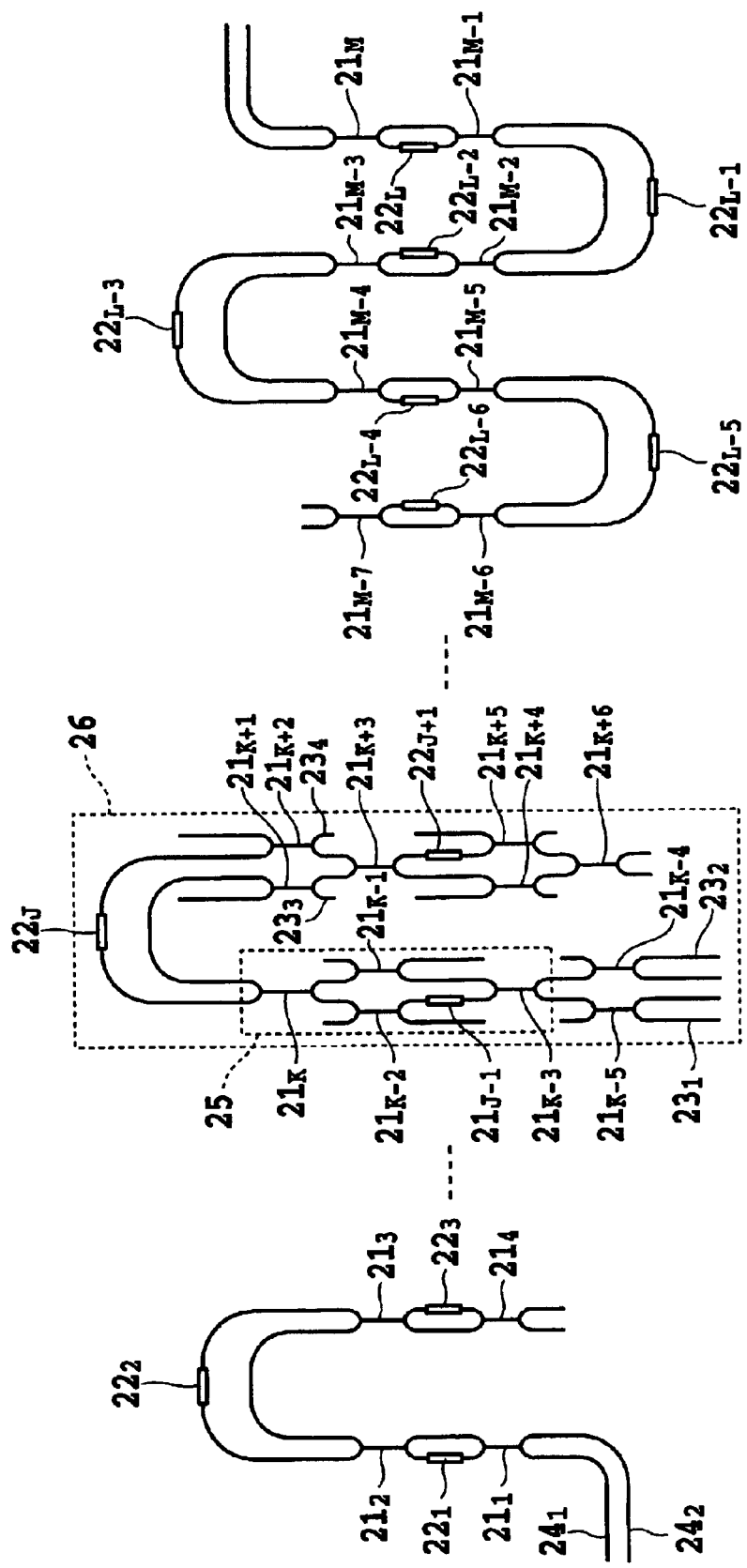
FIG. 1 is a schematic diagram illustrating a conventional adjustment method of the characteristics of a multistage Mach-Zehnder interferometer type optical circuit.
Figure 2:
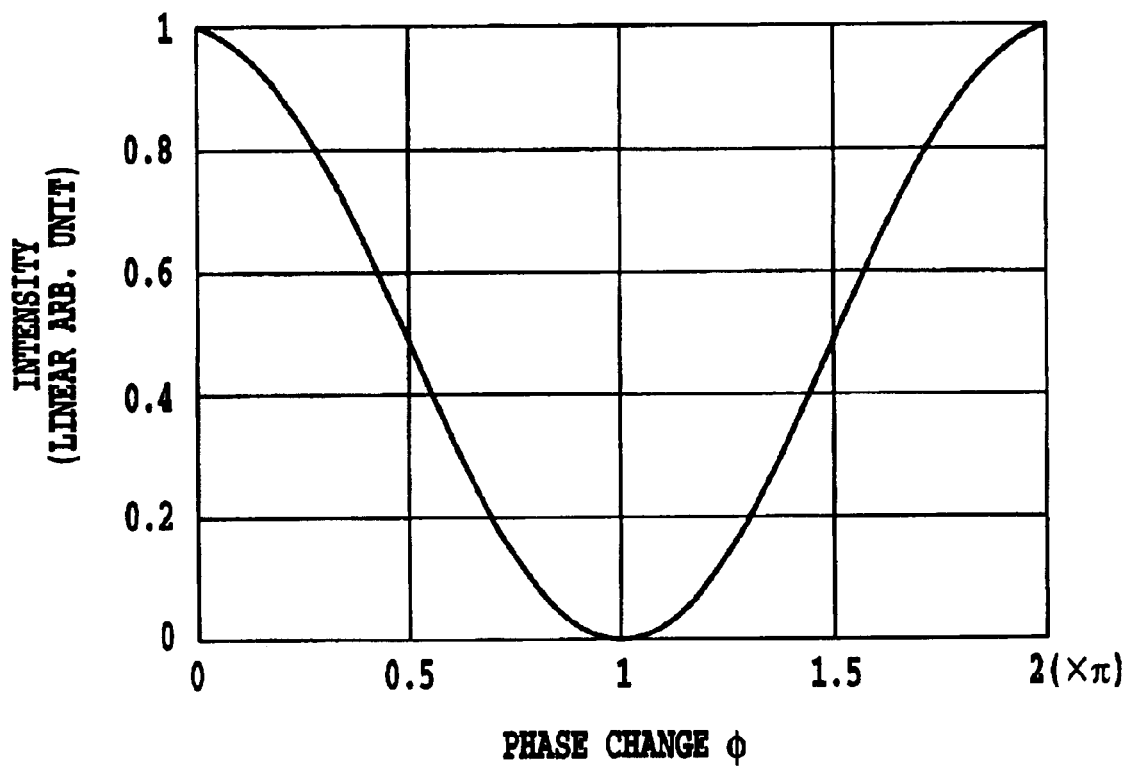
FIG. 2 is a graph illustrating an intensity characteristic of the optical output versus phase changes of a phase controller in a symmetrical Mach-Zehnder interferometer.

It is seen from typical values of $L_c$ and $\Delta L$ given by equations (1) and (2) that $L_c \ll \Delta L$ can be easily achieved. In other words, compared with the coherence length $L_c$ of the low coherence light, the optical path length difference $\Delta L$ between the two optical waveguides (arms) of the asymmetrical Mach-Zehnder interferometer is much longer. Accordingly, the low coherence light does not satisfy the interference condition ($\Delta L \leq L_c$) at the asymmetrical Mach-Zehnder interferometer, thereby causing no interference. However, as for the symmetrical Mach-Zehnder interferometer, since the optical path lengths are designed to become equal between the arms, the low coherence light satisfies the interference condition ($\Delta L \leq L_c$), thereby causing the interference. As a result, in response to the phase difference φ between the arms, the intensity characteristic of the optical output as illustrated in FIG. 2 is obtained, for example.

Usually, the deviation of the optical path length difference of the symmetrical Mach-Zehnder interferometer due to a fabrication error is about one several tenth of the wavelength, that is, about one several tenth of $2\pi$ in terms of the phase φ. Accordingly, the major part of the light is output from the cross port and only a very small part thereof is leaked to the through port in the symmetrical Mach-Zehnder interferometer with two 3 dB directional couplers. Thus, considering a case where the light is incident into the optical waveguide $9_1$ in FIG. 4, the major part of the light is transmitted to the cross port side indicated by arrows in FIG. 4.

Next, a procedure will be described of carrying out measurement and setting of the characteristics of the symmetrical Mach-Zehnder interferometer to be measured by utilizing the foregoing property of the low coherence light. In FIG. 4, the symmetrical Mach-Zehnder interferometer 10 to be measured is enclosed by broken lines. The interferometer 10 to be measured has two input side optical waveguides as its ports $3_1$ and $3_2$, and two output side optical waveguides as its ports $3_3$ and $3_4$. Furthermore, the two output side optical waveguides in the final stage constitute ports $3_5$ and $3_6$.

The lights incident into the ports $3_1$ and $3_2$ on the input side of the symmetrical Mach-Zehnder interferometer 10 to be measured have passed through the optical waveguides having the optical path length difference $\Delta L$ greater than the coherence length. Accordingly, the lights have no correlation between their phase information. Thus, the optical intensities $OUT_1$ and $OUT_2$ at the ports $3_3$ and $3_4$, respectively, are given by the following equations.

$$OUT_1 = I_0\{r \cdot \sin^2(\phi_{Q-1}/2) + (1-r) \cdot \cos^2(\phi_{Q-1}/2)\} = I_0\{1 - r - (1 - 2r) \cdot \sin^2(\phi_{Q-1}/2)\} \qquad (3)$$

$$OUT_2 = I_0\{r \cdot \cos^2(\phi_{Q-1}/2) + (1-r) \cdot \sin^2(\phi_{Q-1}/2)\} = I_0\{r + (1-2r) \cdot \sin^2(\phi_{Q-1}/2)\} \qquad (4)$$

where r: (1−r) is the ratio between the intensities of the input lights to the ports $3_1$ and $3_2$, where r≫1−r; $I_0$ is the intensity of light incident into the symmetrical Mach-Zehnder interferometer 10 to be measured; and phase $\phi_{Q-1}$ is the phase at the phase controller $2_{Q-1}$.

In normal conditions excluding the case of r=0.5, which never occurs in ordinary fabrication conditions, the optical intensities $OUT_1$ and $OUT_2$ vary with the phase $\phi_{Q-1}$, and hence the outputs of the final stage ports $3_5$ and $3_6$ also vary. In other words, the output changes at the final stage ports $3_5$ and $3_6$ correspond to the output changes of the outputs $OUT_1$ and $OUT_2$. Thus, by monitoring the outputs from the final stage ports $3_5$ and $3_6$, a measurement is carried out of the driving amount of the phase controller (corresponding to the phase control signal) at the point at which the outputs become maximum or minimum (that is, the point at which the intensity-coupling ratio becomes 0% or 100%).

Incidentally, a commercially available optical power meter capable of conducting decibel unit measurement of the optical intensity gives the most accurate measurement for the output changes near the minimum output. Thus, the driving amount is usually measured at the point of minimum output. For example, it is known that as for a silica based glass optical waveguide, the refractive index change is proportional to the power based on the thermooptic effect, and that as for a semiconductor optical waveguide, the refractive index change is proportional to the voltage based on the electro-optic effect. Therefore measuring these values makes it possible to obtain the driving amount of the phase controller.

After recording driving amounts $PO_{Q-1,min1}$ and $PO_{Q-1,min2}$ ($PO_{Q-1,min1} < PO_{Q-1,min2}$) measured at two points giving minimum outputs, an adjustment is made using the phase information such that the intensity-coupling ratio between the port $3_1$ or $3_2$ and port $3_3$ or $3_4$ becomes 0% or 100% accurately. Although there is no harm in conducting the following measurement without this adjustment, the adjustment is effective to carry out measurements of the remaining symmetrical Mach-Zehnder interferometers more accurately and simply. The phase information of the individual symmetrical Mach-Zehnder interferometers is obtained by applying the foregoing procedure to the remaining symmetrical Mach-Zehnder interferometers successively.

Although the measurements sequence of the symmetrical Mach-Zehnder interferometers can be arbitrary, successive measurements from the final stage toward the initial stage have an advantage that the resultant phase information is insusceptible to the phase errors that will be brought about by the symmetrical Mach-Zehnder interferometers not yet to be measured. Furthermore, when using a coherent light source (such as an ordinary semiconductor laser) in which $L_c > \Delta L$, its coherent light will cause interference even in the asymmetrical Mach-Zehnder interferometer sections, thereby disabling the foregoing measurement, which must be taken into account.

Next, the procedure of step S2 shown in FIG. 3 will be described. The configuration of the multistage Mach-Zehnder interferometer type optical circuit shown in FIG. 5 is the same as that of the multistage Mach-Zehnder interferometer type optical circuit shown in FIG. 4. For convenience of description of the procedure, the asymmetrical Mach-Zehnder interferometer 11 to be measured is enclosed by broken lines, and its adjacent symmetrical Mach-Zehnder interferometers 12 and 13 at the forward and backward stages, respectively, are enclosed by dash-dotted lines. In addition, the asymmetrical Mach-Zehnder interferometer 11 to be measured has two input side optical waveguides as its ports $4_1$ and $4_2$, and two output side optical waveguides as its ports $4_3$ and $4_4$. Furthermore, the two output side optical waveguides in the final stage constitute ports $4_5$ and $4_6$.

First, only the wavelength tunable light source 6 is connected to the optical waveguide $9_1$ of the multistage Mach-Zehnder interferometer type optical circuit through the optical switch 8. The wavelength tunable light source 6 satisfies the condition of $L_c > \Delta L$, and the wavelength of the output light is set at the operational center frequency of the optical circuit, for example.

This step carries out the measurement and setting of the characteristics of the asymmetrical Mach-Zehnder interferometer 11. More specifically, according to the driving phase amount information of the symmetrical Mach-Zehnder interferometers, which has been measured in the procedure of the foregoing step S1, the intensity-coupling ratios of the two symmetrical Mach-Zehnder interferometers 12 and 13 in FIG. 5 are set at 50%. In this case, a driving amount $PO_r$ required for the symmetrical Mach-Zehnder interferometer arm is given by the following equation for the interferometer 12.

$$PO_r = PO_{U-1,min1} + (PO_{U-1,min2} - PO_{U-1,min1})/4 \quad (5)$$

Figure 6A:
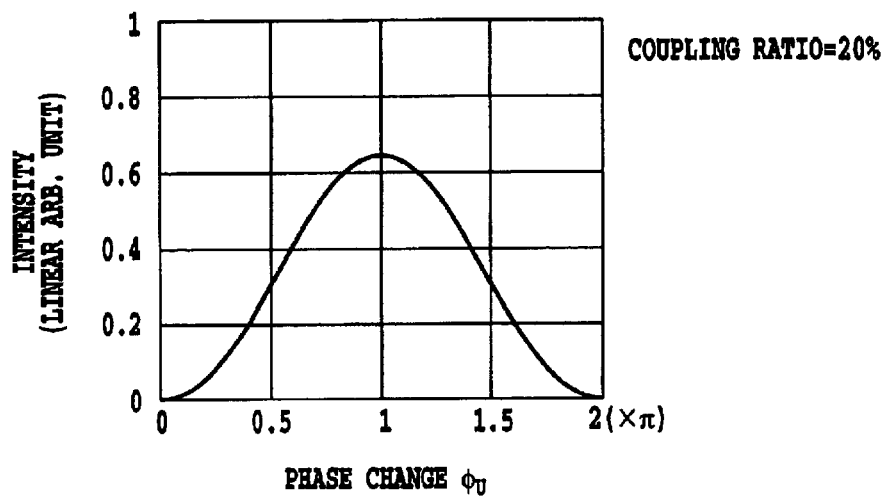
FIG. 6A is a graph illustrating an intensity characteristic of a symmetrical Mach-Zehnder interferometer based on an intensity-coupling ratio, where the intensity-coupling ratio is 20%.
Figure 6B:
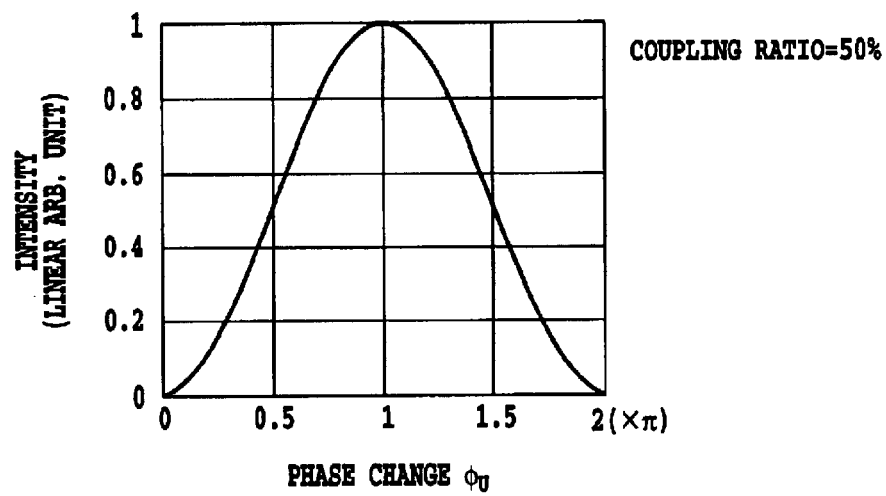
FIG. 6B is a graph illustrating the intensity characteristic of the symmetrical Mach-Zehnder interferometer based on the intensity-coupling ratio, where the intensity-coupling ratio is 50%.
Figure 6C:
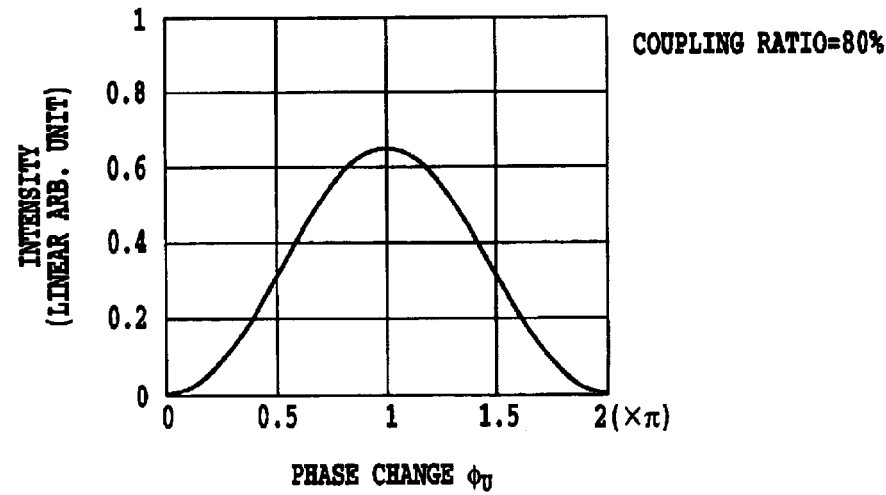
FIG. 6C is a graph illustrating the intensity characteristic of a symmetrical Mach-Zehnder interferometer based on the intensity-coupling ratio, where the intensity-coupling ratio is 80%.

FIGS. 6A–6C are graphs illustrating the intensity characteristics of the symmetrical Mach-Zehnder interferometer for the individual intensity-coupling ratios. Specifically, they exhibit the intensity characteristics versus the phase change $\phi_U$ of the phase controller $2_U$ between the ports $4_1$ and $4_3$, when the intensity-coupling ratios of the symmetrical Mach-Zehnder interferometers 12 and 13 in FIG. 5 are used as parameters. FIG. 6A illustrates a case when the intensity-coupling ratio is 20%, FIG. 6B illustrates a case when it is 50%, and FIG. 6C illustrates a case when it is 80%. The characteristics of the symmetrical Mach-Zehnder interferometers 12 and 13 are normalized such that they take the maximum intensity when the coupling ratios are 50%. Although the coupling ratios of the symmetrical Mach-Zehnder interferometers can be set at any value except for 0% and 100%, the coupling ratios of 50% as illustrated in FIGS. 6A–6C offer the following advantage. The coupling ratios of 50% can maximize the intensity difference between the maximum value and minimum value of the optical output intensity, thereby offering an advantage of making the measurement more accurate and simple.

In FIG. 5, the intensity transmittance of the symmetrical Mach-Zehnder interferometers other than the two symmetrical Mach-Zehnder interferometers 12 and 13 adjacent to the asymmetrical Mach-Zehnder interferometer 11 to be measured is set at 0% or 100% based on the measurement information at step S1. The reason for this is as follows. Since the wavelength tunable light used in the present step S2 is coherent light, it can cause interference in the asymmetrical Mach-Zehnder interferometers other than the asymmetrical Mach-Zehnder interferometer 11 to be measured. Accordingly, it is necessary for the measurement of the asymmetrical Mach-Zehnder interferometer 11 to be measured to avoid such interference as much as possible. Thus, the transmittance of the remaining symmetrical Mach-Zehnder interferometers except 12 and 13 is set at 100% for their cross ports, which enables the light to propagate as indicated by arrows in FIG. 5 when the phase $\phi_U$ is an integer multiple of $2\pi$. As a result, the light can propagate through the asymmetrical Mach-Zehnder interferometers other than the asymmetrical Mach-Zehnder interferometer 11 to be measured without interference.

After carrying out the foregoing settings for the individual interferometers, the output light from the asymmetrical Mach-Zehnder interferometer 11 to be measured is measured at the final stage ports $4_5$ and $4_6$. Then, the driving amount $PO_{U,min}$ of the phase controller $2_U$ is measured and recorded when the output light intensity becomes minimum or maximum (that is, when the intensity-coupling ratio is 0% or 100%). The procedure is performed successively for the remaining asymmetrical Mach-Zehnder interferometers so that the driving amounts of their individual phase controllers are measured and recorded.

Although the measurements sequence of the asymmetrical Mach-Zehnder interferometers can be arbitrary, successive measurements from the final stage to the initial stage have an advantage that the resultant phase information is insusceptible to the phase errors that will be brought about by the asymmetrical Mach-Zehnder interferometers not yet to be measured.

Finally, the procedure of step S3 in FIG. 3 is carried out. To achieve desired optical output characteristics of the multistage Mach-Zehnder interferometer type optical circuit, it is necessary to calculate the phase shift amount $\eta_v$ required for the individual symmetrical Mach-Zehnder interferometers in accordance with the application purpose of the multistage Mach-Zehnder interferometer type optical circuit (such as an optical filter, dispersion compensator, or gain equalizer) and the characteristics to be satisfied. Once the phase shift amount $\eta_v$ and the phase information on the driving amounts measured at step S1 have been obtained, the driving amounts $PO_{v,r}$ actually set to the symmetrical Mach-Zehnder interferometers are given by the following equation.

$$PO_{v,r} = PO_{v,min1} + (PO_{v,min2} - PO_{v,min1}) \times \eta_v/(2\times\pi) \quad (6)$$

where $PO_{v,min1}$ and $PO_{v,min2}$ are driving amounts obtained at step S1.

The phase setting of the individual symmetrical Mach-Zehnder interferometers is carried out based on the driving amounts $PO_{v,r}$. In addition, the phase setting of the individual asymmetrical Mach-Zehnder interferometers is carried out in the same manner as that of the symmetrical Mach-Zehnder interferometers using the values $PO_{w,min}$ obtained at step S2. Thus, the desired characteristics are obtained ultimately.

Incidentally, in the phase measurements at steps S1 and S2, the accuracy of the setting can be improved by carrying out the phase modulation of the optical waveguides as needed, and by conducting synchronous detection using a lock-in amplifier and the like.

In summary, the procedure of the characteristic adjustment method of the multistage Mach-Zehnder interferometer type optical circuit in accordance with the present invention is as follows.

As for the multistage Mach-Zehnder interferometer type optical circuit including the symmetrical Mach-Zehnder interferometers and asymmetrical Mach-Zehnder interferometers connected in cascade, when the low coherence light is input which has a coherence length shorter than the minimum optical path length difference of the asymmetrical Mach-Zehnder interferometers, the lights interfere only in the symmetrical Mach-Zehnder interferometers, but not in the asymmetrical Mach-Zehnder interferometer.

Therefore, first, it is possible for all the symmetrical Mach-Zehnder interferometers to sequentially measure relationships between the driving amounts of the phase controllers in the individual symmetrical Mach-Zehnder interferometers and the actual phase shift amounts, by launching the low coherence light with the coherence length shorter than the minimum optical path length difference of the asymmetrical Mach-Zehnder interferometers into the multistage Mach-Zehnder interferometer type optical circuit, and by measuring the intensity change of the output light when changing the driving amount of the phase controller in each symmetrical Mach-Zehnder interferometer, where the driving amount corresponds to the phase control signal such as applied thermooptic power in the silica based glass optical waveguides, and an applied voltage in the semiconductor optical waveguides.

Second, while launching the light from the wavelength tunable coherent light source into the multistage Mach-Zehnder interferometer type optical circuit, the intensity-coupling ratios of the two symmetrical Mach-Zehnder interferometers adjacent to the asymmetrical Mach-Zehnder interferometer to be measured are set at 50% in accordance with the measurement of the two symmetrical Mach-Zehnder interferometers, and the intensity-coupling ratios of the symmetrical Mach-Zehnder interferometers other than the two symmetrical Mach-Zehnder interferometers are set at 0% or 100%. In the conditions of such intensity-coupling ratios, each asymmetrical Mach-Zehnder interferometer between the symmetrical Mach-Zehnder interferometers whose intensity-coupling ratios are set at 0% or 100% has no effect on the output light. Thus, the output light is changed only by the phase change in the asymmetrical Mach-Zehnder interferometer to be measured, that is, the asymmetrical Mach-Zehnder interferometer between the symmetrical Mach-Zehnder interferometers whose intensity-coupling ratios are set at 50%. Therefore it is possible to measure the relationship between the driving amount of the phase controller in the asymmetrical Mach-Zehnder interferometer to be measured and the actual phase shift amount by measuring the intensity change of the output light while changing the driving amount of the phase controller of the asymmetrical Mach-Zehnder interferometer to be measured. Thus, the phase characteristics of all the asymmetrical Mach-Zehnder interferometers can be measured by sequentially changing the asymmetrical Mach-Zehnder interferometers to be measured.

Third, according to the measurement results of the driving amounts of the phase controllers in the individual interferometers, which have been obtained in the foregoing measurement procedures, the phase controllers of the individual interferometers are assigned appropriate driving amounts. Thus, the phase control amounts of the individual interferometers is adjusted to the phase shift amounts of the desired optical output, thereby implementing the desired optical characteristic of the whole optical circuit.

The description up to now is made by way of the example using as the phase controllers the silica based glass optical waveguide whose refractive index change is proportional to the thermooptic power. However, the waveguides are not limited to a glass optical waveguide such as a silica based glass optical waveguide or an optical fiber. For example, the present invention is also applicable to the characteristic adjustment of a multistage Mach-Zehnder interferometer type optical circuit including a dielectric optical waveguide or semiconductor optical waveguide, utilizing the electro-optic effect in which the refractive index change is proportional to the applied electric field. In addition, as for a multistage Mach-Zehnder interferometer type optical circuit with a hybrid-integrated configuration including a combination of several different types of optical waveguides, its whole characteristic adjustment can be performed by carrying out the characteristic adjustment in accordance with the present invention appropriately with changing the phase control effect according to the types of the individual optical waveguide sections.

Furthermore, the present invention is applicable not only to the multistage Mach-Zehnder interferometer type optical circuit with the configuration shown in FIGS. 4 and 5, but also to the multistage Mach-Zehnder interferometer type optical circuit including the symmetrical Mach-Zehnder interferometers and asymmetrical Mach-Zehnder interferometers that are connected with arbitraray numbers in arbitrary sequence. For example, the present invention is applicable to the multistage Mach-Zehnder interferometer type optical circuit with the configuration shown in FIG. 7 or 8.

Figure 7:
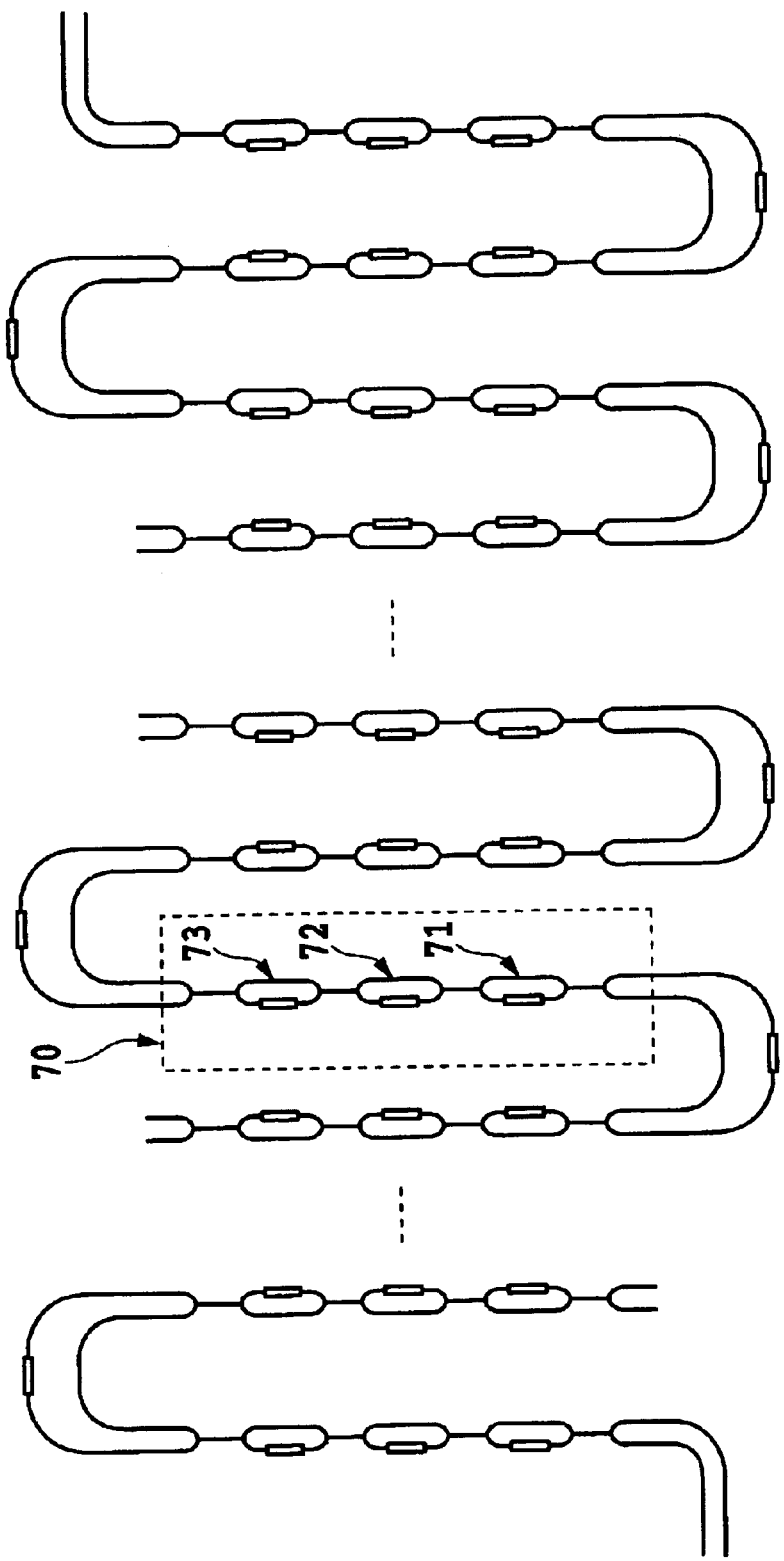
FIG. 7 is a schematic diagram illustrating a configuration of a multistage Mach-Zehnder interferometer type optical circuit including three symmetrical Mach-Zehnder interferometers connected in cascade.

FIG. 7 is a schematic diagram illustrating a configuration of a multistage Mach-Zehnder interferometer type optical circuit including consecutive three symmetrical Mach-Zehnder interferometers connected in cascade. The main points will be described below. As for the one-stage symmetrical Mach-Zehnder interferometer shown in FIG. 4 or 5, when the intensity-coupling ratios of the directional couplers placed at its both ends deviates from 50%, it is difficult to achieve an arbitrary intensity-coupling ratio in the range of 0–100% as the entire symmetrical Mach-Zehnder interferometer. In contrast with this, as for a three-stage symmetrical Mach-Zehnder interferometer 70 including three symmetrical Mach-Zehnder interferometers (71, 72 and 73) connected in cascade as shown in FIG. 7, adjustment of the intensity-coupling ratios in the two symmetrical Mach-Zehnder interferometers (71, 73) at both ends at 50% accurately is easy. As a result, the whole three-cascaded symmetrical Mach-Zehnder interferometer 70 can easily implement an arbitrary intensity-coupling ratio in the range of 0–100%, thereby being able to implement the desired circuit characteristics with high accuracy easily.

Figure 8:
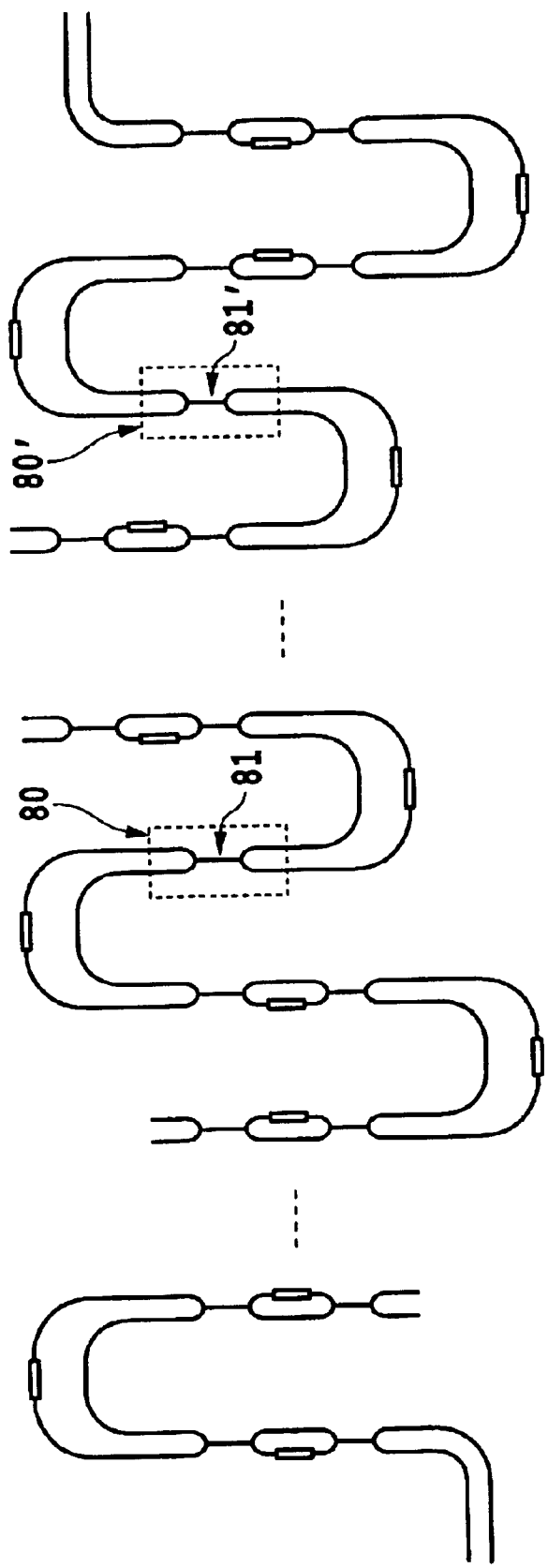
FIG. 8 is a schematic diagram illustrating a multistage Mach-Zehnder interferometer type optical circuit with a configuration in which symmetrical Mach-Zehnder interferometers are partially removed to be replaced by directional couplers with fixed intensity-coupling ratios.

FIG. 8 is a schematic diagram illustrating a multistage Mach-Zehnder interferometer type optical circuit with a configuration in which symmetrical Mach-Zehnder interferometers are partially removed, and these portions (80 and 80') are replaced by directional couplers (81 and 81') with fixed intensity-coupling ratios. Fixing the intensity-coupling ratios of the directional couplers can facilitate the characteristic adjustment of the whole optical circuit, and reduce the size of the optical circuit. The configuration is particularly effective to implement the optical circuit characteristics with a limited range.

It is obvious that the changes in the configurations of the multistage Mach-Zehnder interferometer type optical circuits as shown in FIGS. 7 and 8 are not limited to the multistage structure or partial omission of the symmetrical Mach-Zehnder interferometers. Similar changes are also applicable to the configuration of the asymmetrical Mach-Zehnder interferometers.

To rerify the effectiveness of the characteristics adjustment method of the multistage Mach-Zehnder interferometer type optical circuit in accordance with the present invention, a multistage Mach-Zehnder interferometer type optical circuit without monitoring ports (circuit 1) was fabricated using a silica based glass optical waveguide technology, and its characteristic adjustment was carried out by applying the characteristic adjustment method in accordance with the present invention. In addition, as a reference of the characteristics comparison, a conventional multistage Mach-Zehnder interferometer type optical circuit with monitoring ports (circuit 2) was fabricated using the silica based glass optical waveguide technology, and its characteristic adjustment was carried out by the conventional method using the monitoring ports. The two multistage Mach-Zehnder interferometer type optical circuits, both of which include seven symmetrical Mach-Zehnder (MZ) interferometers and six asymmetrical Mach-Zehnder (MZ) interferometers, were adjusted to realize a dispersion compensator function.

Table 1 shows the summary of the parameter values and measured results of characteristics of the two optical circuits. The two optical circuits differ in the FSR values besides the presence or absence of the monitoring ports. However, the difference in the FSR values is only 4.133 mm in terms of the total optical path length difference (circuit 2>circuit 1), which will not cause the optical loss difference in a low-loss silica-based optical waveguide (~0.01 dB/cm).

Comparison of the losses between the two optical circuits show that the conventional optical circuit (circuit 2) has the loss of 9.1 dB, whereas the optical circuit in accordance with the present invention (circuit 1) has the loss of 1.7 dB, which means that the present circuit 1 has a much lower optical loss characteristic. As for the size of the optical circuits, the conventional optical circuit (circuit 2) has the dimensions of 69×85 mm$^2$ (5865 mm$^2$), whereas the optical circuit in accordance with the present invention (circuit 1) has the dimensions of 33×75 mm$^2$ (2475 mm$^2$), which means that the size of the present optical circuit can be reduced to about 42% of the conventional one.

Thus, it is clear that the present invention is effective for reducing the loss and size of the optical circuit.

TABLE 1

| optical circuit | relative refractive index difference (%) | Number of symmetrical MZ type interferometers | Number of asymmetrical MZ type interferometers | FSR (GHz) | size (mm$^2$) | optical loss (dB) |
|---|---|---|---|---|---|---|
| circuit 1 | 0.75 | 7 | 6 | 100 | 33 × 75 | 1.7 |
| circuit 2 | 0.75 | 7 | 6 | 75 | 69 × 85 | 9.1 |

As described above, according to the present invention, the following steps are taken. First, the phase control conditions of the individual symmetrical Mach-Zehnder interferometers are obtained without the effect of the asymmetrical Mach-Zehnder interferometers by using the low coherence light. Second, the phase control conditions of the individual asymmetrical Mach-Zehnder interferometers are obtained under the control of the symmetrical Mach-Zehnder interferometer type optical circuits based on the phase control conditions obtained at the first step. Finally, the appropriate phase shift amounts of all the interferometers are set according to the phase control conditions of the symmetrical Mach-Zehnder interferometers and asymmetrical Mach-Zehnder interferometers.

Thus, the monitoring ports (monitoring circuits) can be eliminated, which can solve the problem of increasing the device size and optical signal loss. In addition, since the phase shift amounts can be set accurately, fabrication errors can be corrected easily. Furthermore, the phases of the complicated multistage Mach-Zehnder interferometer type optical circuit can be set precisely.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An adjustment method of characteristics of a multistage Mach-Zehnder interferometer type optical circuit that includes:

a first input/output optical waveguide pair;

a second input/output optical waveguide pair;

M directional couplers disposed between said first and second input/output optical waveguide pairs, where M is an integer equal to or greater than two; and (M−1) phase control means, each of which is disposed between two adjacent directional couplers of said M directional couplers, is attached to at least one of two optical waveguides of the optical waveguide pair placed between said adjacent directional couplers, and controls relative phase of light beams passing through a first optical waveguide and a second optical waveguide of said optical waveguide pair in response to a phase control signal, wherein said adjacent directional couplers, said phase control means disposed between said adjacent directional couplers, and said optical waveguide pairs that are disposed between said directional couplers and have same optical path lengths constitute symmetrical Mach-Zehnder type optical interferometers, whereas said adjacent directional couplers, said phase control means disposed between said adjacent directional couplers, and said optical waveguide pairs that are disposed between said directional couplers and have different optical path lengths constitute asymmetrical Mach-Zehnder type optical interferometers, and (M−1) Mach-Zehnder type optical interferometers are connected in cascade to construct said multistage Mach-Zehnder interferometer type optical circuit, said adjustment method of the characteristics of the multistage Mach-Zehnder interferometer type optical circuit comprising:

a first step of sequentially carrying out, for each of said symmetrical Mach-Zehnder interferometers, setting of the phase control signal based on a correlation between the phase control signal of said phase control means disposed in said symmetrical Mach-Zehnder interferometer and optical intensity output from a first optical waveguide of said second input/output optical waveguide pair disposed in an output side of said multistage Mach-Zehnder interferometer type optical circuit, after inputting low coherence light, which has a coherence length shorter than a minimum optical path length difference between said asymmetrical Mach-Zehnder interferometers, from a first optical waveguide of said first input/output optical waveguide pair disposed at an input side of said multistage Mach-Zehnder interferometer type optical circuit;

a second step of sequentially carrying out, for each of said asymmetrical Mach-Zehnder interferometers, setting of the phase control signal based on a correlation between the phase control signal of said phase control means disposed in said asymmetrical Mach-Zehnder interferometer and optical intensity output from one of first and second optical waveguides of said second input/output optical waveguide pair disposed in the output side of said multistage Mach-Zehnder interferometer type optical circuit, after inputting wavelength tunable coherent light from one of first and second optical waveguides of said first input/output optical waveguide pair disposed at the input side of said multistage Mach-Zehnder interferometer type optical circuit; and a third step of optimizing the individual phase control signals of said phase control means to achieve a desired characteristic of the output light from said multistage Mach-Zehnder interferometer type optical circuit based on the correlations between the phase control signals and output light intensity obtained at the first step and the second step.

2. The adjustment method of the characteristics of the multistage Mach-Zehnder interferometer type optical circuit as claimed in claim 1, wherein an optical input to said multistage Mach-Zehnder interferometer type optical circuit at the first step and the second step is carried out by using optical path switching means including two optical input sections and two optical output sections and capable of selecting an optical path between the optical input sections and the optical output sections, in which said two optical input sections are connected to the low coherence light and the wavelength tunable coherent light, respectively, said two optical output sections are connected to said first input/output optical waveguide pair, and said optical path switching means carries out optical path switching to select one of the low coherence light and the wavelength tunable coherent light as the input light.

3. The adjustment method of the characteristics of the multistage Mach-Zehnder interferometer type optical circuit as claimed in claim 1, wherein the setting of each of the phase control signals at the first step is carried out in response to the optical output intensity from the first optical waveguide of said second input/output optical waveguide pair such that the phase control signal of said phase control means disposed in said symmetrical Mach-Zehnder interferometer makes an intensity-coupling ratio of said symmetrical Mach-Zehnder interferometer equal to one of 0% and 100%; and the setting of each of the phase control signals at the second step is carried out such that an intensity-coupling ratio of two of said symmetrical Mach-Zehnder interferometers adjacent to both ends of each of said asymmetrical Mach-Zehnder interferometers becomes 50%, and intensity-coupling ratios of the symmetrical Mach-Zehnder interferometers other than the two symmetrical Mach-Zehnder interferometers become one of 0% and 100%, by setting the phase control signals of the phase control means disposed in said symmetrical Mach-Zehnder interferometers based on the correlations obtained at the first step, and such that intensity-coupling ratios of said asymmetrical Mach-Zehnder interferometers become one of 0% and 100%.

4. The adjustment method of the characteristics of the multistage Mach-Zehnder interferometer type optical circuit as claimed in claim 3, wherein an optical input to said multistage Mach-Zehnder interferometer type optical circuit at the first step and the second step is carried out by using optical path switching means including two optical input sections and two optical output sections and capable of selecting an optical path between the optical input sections and the optical output sections, in which said two optical input sections are connected to the low coherence light and the wavelength tunable coherent light, respectively, said two optical output sections are connected to said first input/output optical waveguide pair, and said optical path switching means carries out optical path switching to select one of the low coherence light and the wavelength tunable coherent light as the input light.

5. The adjustment method of the characteristics of the multistage Mach-Zehnder interferometer type optical circuit as claimed in claim 1, wherein the settings of the phase control signals at the first step and the second step are each carried out sequentially from said phase control means disposed in the output side of said multistage Mach-Zehnder interferometer type optical circuit toward said phase control means disposed in the input side of said multistage Mach-Zehnder interferometer type optical circuit.

6. The adjustment method of the characteristics of the multistage Mach-Zehnder interferometer type optical circuit as claimed in claim 5, wherein an optical input to said multistage Mach-Zehnder interferometer type optical circuit at the first step and the second step is carried out by using optical path switching means including two optical input sections and two optical output sections and capable of selecting an optical path between the optical input sections and the optical output sections, in which said two optical input sections are connected to the low coherence light and the wavelength tunable coherent light, respectively, said two optical output sections are connected to said first input/output optical waveguide pair, and said optical path switching means carries out optical path switching to select one of the low coherence light and the wavelength tunable coherent light as the input light.

7. The adjustment method of the characteristics of the multistage Mach-Zehnder interferometer type optical circuit as claimed in claim 3, wherein the settings of the phase control signals at the first step and the second step are each carried out sequentially from said phase control means disposed in the output side of said multistage Mach-Zehnder interferometer type optical circuit toward said phase control means disposed in the input side of said multistage Mach-Zehnder interferometer type optical circuit.

8. The adjustment method of the characteristics of the multistage Mach-Zehnder interferometer type optical circuit as claimed in claim 7, wherein an optical input to said multistage Mach-Zehnder interferometer type optical circuit at the first step and the second step is carried out by using optical path switching means including two optical input sections and two optical output sections and capable of selecting an optical path between the optical input sections and the optical output sections, in which said two optical input sections are connected to the low coherence light and the wavelength tunable coherent light, respectively, said two optical output sections are connected to said first input/output optical waveguide pair, and said optical path switching means carries out optical path switching to select one of the low coherence light and the wavelength tunable coherent light as the input light.

9. An adjustment method of characteristics of a multistage Mach-Zehnder interferometer type optical circuit that includes:

a first input/output optical waveguide pair;

a second input/output optical waveguide pair;

2(N+1) directional couplers disposed between said first and second input/output optical waveguide pairs, where N is an integer equal to or greater than one; and (2N+1) phase control means, each of which is disposed between two adjacent directional couplers of said 2(N+1) directional couplers, is attached to at least one of two optical waveguides of the optical waveguide pair placed between said adjacent directional couplers, and controls relative phase of light beams passing through a first optical waveguide and a second optical waveguide of said optical waveguide pair in response to a phase control signal, wherein said adjacent directional couplers, said phase control means disposed between said adjacent directional couplers, and said optical waveguide pairs that are disposed between said directional couplers and have same optical path lengths constitute symmetrical Mach-Zehnder type optical interferometers, whereas said adjacent directional couplers, said phase control means disposed between said adjacent directional couplers, and said optical waveguide pairs that are disposed between said directional couplers and have different optical path lengths constitute asymmetrical Mach-Zehnder type optical interferometers, and (N+1) said symmetrical Mach-Zehnder type optical interferometers and N said asymmetrical Mach-Zehnder type optical interferometers are alternately connected in cascade to construct said multistage Mach-Zehnder interferometer type optical circuit, said adjustment method of the characteristics of the multistage Mach-Zehnder interferometer type optical circuit comprising:

a first step of sequentially carrying out, for each of said symmetrical Mach-Zehnder interferometers, setting of the phase control signal based on a correlation between the phase control signal of said phase control means disposed in said symmetrical Mach-Zehnder interferometer and optical intensity output from a first optical waveguide of said second input/output optical waveguide pair disposed in an output side of said multistage Mach-Zehnder interferometer type optical circuit, after inputting low coherence light, which has a coherence length shorter than a minimum optical path length difference between said asymmetrical Mach-Zehnder interferometers, from a first optical waveguide of said first input/output optical waveguide pair disposed at an input side of said multistage Mach-Zehnder interferometer type optical circuit;

a second step of sequentially carrying out, for each of said asymmetrical Mach-Zehnder interferometers, setting of the phase control signal based on a correlation between the phase control signal of said phase control means disposed in said asymmetrical Mach-Zehnder interferometer and optical intensity output from one of first and second optical waveguides of said second input/output optical waveguide pair disposed in the output side of said multistage Mach-Zehnder interferometer type optical circuit, after inputting wavelength tunable coherent light from one of first and second optical waveguides of said first input/output optical waveguide pair disposed at the input side of said multistage Mach-Zehnder interferometer type optical circuit; and a third step of optimizing the individual phase control signals of said phase control means to achieve a desired characteristic of the output light from said multistage Mach-Zehnder interferometer type optical circuit based on the correlations between the phase control signals and output light intensity obtained at the first step and the second step.

10. The adjustment method of the characteristics of the multistage Mach-Zehnder interferometer type optical circuit as claimed in claim 9, wherein an optical input to said multistage Mach-Zehnder interferometer type optical circuit at the first step and the second step is carried out by using optical path switching means including two optical input sections and two optical output sections and capable of selecting an optical path between the optical input sections and the optical output sections, in which said two optical input sections are connected to the low coherence light and the wavelength tunable coherent light, respectively, said two optical output sections are connected to said first input/output optical waveguide pair, and said optical path switching means carries out optical path switching to select one of the low coherence light and the wavelength tunable coherent light as the input light.

11. The adjustment method of the characteristics of the multistage Mach-Zehnder interferometer type optical circuit as claimed in claim 9, wherein the setting of each of the phase control signals at the first step is carried out in response to the optical output intensity from the first optical waveguide of said second input/output optical waveguide pair such that the phase control signal of said phase control means disposed in said symmetrical Mach-Zehnder interferometer makes an intensity-coupling ratio of said symmetrical Mach-Zehnder interferometer equal to one of 0% and 100%; and the setting of each of the phase control signals at the second step is carried out such that an intensity-coupling ratio of two of said symmetrical Mach-Zehnder interferometers adjacent to both ends of each of said asymmetrical Mach-Zehnder interferometers becomes 50%, and intensity-coupling ratios of the symmetrical Mach-Zehnder interferometers other than the two symmetrical Mach-Zehnder interferometers become one of 0% and 100%, by setting the phase control signals of the phase control means disposed in said symmetrical Mach-Zehnder interferometers based on the correlations obtained at the first step, and such that intensity-coupling ratios of said asymmetrical Mach-Zehnder interferometers become one of 0% and 100%.

12. The adjustment method of the characteristics of the multistage Mach-Zehnder interferometer type optical circuit as claimed in claim 11, wherein an optical input to said multistage Mach-Zehnder interferometer type optical circuit at the first step and the second step is carried out by using optical path switching means including two optical input sections and two optical output sections and capable of selecting an optical path between the optical input sections and the optical output sections, in which said two optical input sections are connected to the low coherence light and the wavelength tunable coherent light, respectively, said two optical output sections are connected to said first input/output optical waveguide pair, and said optical path switching means carries out optical path switching to select one of the low coherence light and the wavelength tunable coherent light as the input light.

13. The adjustment method of the characteristics of the multistage Mach-Zehnder interferometer type optical circuit as claimed in claim 9, wherein
the settings of the phase control signals at the first step and the second step are each carried out sequentially from said phase control means disposed in the output side of said multistage Mach-Zehnder interferometer type optical circuit toward said phase control means disposed in the input side of said multistage Mach-Zehnder interferometer type optical circuit.

14. The adjustment method of the characteristics of the multistage Mach-Zehnder interferometer type optical circuit as claimed in claim 13, wherein
an optical input to said multistage Mach-Zehnder interferometer type optical circuit at the first step and the second step is carried out by using optical path switching means including two optical input sections and two optical output sections and capable of selecting an optical path between the optical input sections and the optical output sections, in which said two optical input sections are connected to the low coherence light and a light source of the wavelength tunable coherent light, respectively, said two optical output sections are connected to said first input/output optical waveguide pair, and said optical path switching means carries out optical path switching to select one of the low coherence light and the wavelength tunable coherent light as the input light.

15. The adjustment method of the characteristics of the multistage Mach-Zehnder interferometer type optical circuit as claimed in claim 11, wherein
the settings of the phase control signals at the first step and the second step are each carried out sequentially from said phase control means disposed in the output side of said multistage Mach-Zehnder interferometer type optical circuit toward said phase control means disposed in the input side of said multistage Mach-Zehnder interferometer type optical circuit.

16. The adjustment method of the characteristics of the multistage Mach-Zehnder interferometer type optical circuit as claimed in claim 15, wherein
an optical input to said multistage Mach-Zehnder interferometer type optical circuit at the first step and the second step is carried out by using optical path switching means including two optical input sections and two optical output sections and capable of selecting an optical path between the optical input sections and the optical output sections, in which said two optical input sections are connected to the low coherence light and a light source of the wavelength tunable coherent light, respectively, said two optical output sections are connected to said first input/output optical waveguide pair, and said optical path switching means carries out optical path switching to select one of the low coherence light and the wavelength tunable coherent light as the input light.

17. A multistage Mach-Zehnder interferometer type optical circuit comprising:
a first input/output optical waveguide pair;
a second input/output optical waveguide pair;
M directional couplers disposed between said first and second input/output optical waveguide pairs, where M is an integer equal of or greater than two; and
(M-1) phase control means, each of which is disposed between two adjacent directional couplers of said M directional couplers, is attached to at least one of two optical waveguides of the optical waveguide pair placed between said adjacent directional couplers, and controls relative phase of light beams passing through a first optical waveguide and a second optical waveguide of said optical waveguide pair in response to a phase control signal, wherein
said adjacent directional couplers, said phase control means disposed between said adjacent directional couplers, and said optical waveguide pairs that are disposed between said directional couplers and have same optical path lengths constitute symmetrical Mach-Zehnder type optical interferometers, whereas said adjacent directional couplers, said phase control means disposed between said adjacent directional couplers, and said optical waveguide pairs that are disposed between said directional couplers and have different optical path lengths constitute asymmetrical Mach-Zehnder type optical interferometers, and (M-1) Mach-Zehnder type optical interferometers are connected in cascade to construct said multistage Mach-Zehnder interferometer type optical circuit, wherein
said symmetrical Mach-Zehnder type optical interferometers and said asymmetrical Mach-Zehnder type optical interferometers connected in cascade are subjected to the characteristic adjustment by:
sequentially carrying out, for each of said symmetrical Mach-Zehnder interferometers, setting of the phase control signal based on a correlation between the phase control signal of said phase control means disposed in said symmetrical Mach-Zehnder interferometer and optical intensity output from a first optical waveguide of said second input/output optical waveguide pair disposed in an output side of said multistage Mach-Zehnder interferometer type optical circuit, after inputting low coherence light, which has a coherence length shorter than a minimum optical oath length difference between said asymmetrical Mach-Zehnder interferometers, from a first optical waveguide of said first input/output optical waveguide pair disposed at an input side of said multistage Mach-Zehnder interferometer type optical circuit;
sequentially carrying out, for each of said asymmetrical Mach-Zehnder interferometers, setting of the phase control signal based on a correlation between the phase control signal of said phase control means disposed in said asymmetrical Mach-Zehnder interferometer and optical intensity output from one of first an second optical waveguides of said second input/output optical waveguide pair disposed in the output side of said multistage Mach-Zehnder interferometer type optical circuit, after inputting wavelength tunable coherent light from one of first and second optical waveguides of said first input/output optical waveguide pair disposed at the input side of said multistage Mach-Zehnder interferometer type optical circuit; and
optimizing the individual phase control signals of said phase control means to achieve a desired characteristic of the output light from said multistage Mach-Zehnder interferometer type optical circuit based on the correlations between the phase control signals and output light intensity obtained for said symmetrical Mach-Zehnder interferometers and said asymmetrical Mach-Zehnder interferometers.

18. A multistage Mach-Zehnder interferometer type optical circuit comprising:

a first input/output optical waveguide pair;

a second input/output optical waveguide pair;

2(N+1) directional couplers disposed between said first and second input/output optical waveguide pairs, where N is an integer equal to or greater than one; and (2N+1) phase control means, each of which is disposed between two adjacent directional couplers of said 2(N+1) directional couplers, is attached to at least one of two optical waveguides of the optical waveguide pair placed between said adjacent directional couplers, and controls relative phase of light beams passing through a first optical waveguide and a second optical waveguide of said optical waveguide pair in response to a phase control signal, wherein said adjacent directional couplers, said phase control means disposed between said adjacent directional couplers, and said optical waveguide pairs that are disposed between said directional couplers and have same optical path lengths constitute symmetrical Mach-Zehnder type optical interferometers, whereas said adjacent directional couplers, said phase control means disposed between said adjacent directional couplers, and said optical waveguide pairs that are disposed between said directional couplers and have different optical path lengths constitute asymmetrical Mach-Zehnder type optical interferometers, and (N+1) said symmetrical Mach-Zehnder type optical interferometers and N said asymmetrical Mach-Zehnder type optical interferometers are alternately connected in cascade to construct said multistage Mach-Zehnder interferometer type optical circuit, wherein said (N+1) symmetrical Mach-Zehnder type optical interferometers and said N asymmetrical Mach-Zehnder type optical interferometers connected in cascade are subjected to the characteristic adjustment by:

sequentially carrying out, for each of said symmetrical Mach-Zehnder interferometers, setting of the phase control signal based on a correlation between the phase control signal of said phase control means disposed in said symmetrical Mach-Zehnder interferometer and optical intensity output from a first optical waveguide of said second input/output optical waveguide pair disposed in an output side of said multistage Mach-Zehnder interferometer type optical circuit, after inputting low coherence light, which has a coherence length shorter than a minimum optical path length difference between said asymmetrical Mach-Zehnder interferometers, from a first optical waveguide of said first input/output optical waveguide pair disposed at an input side of said multistage Mach-Zehnder interferometer type optical circuit;

sequentially carrying out, for each of said asymmetrical Mach-Zehnder interferometers, setting of the phase control signal based on a correlation between the phase control signal of said phase control means disposed in said asymmetrical Mach-Zehnder interferometer and optical intensity output from one of first and second optical waveguides of said second input/output optical waveguide pair disposed in the output side of said multistage Mach-Zehnder interferometer type optical circuit, after inputting wavelength tunable coherent light from one of first and second optical waveguides of said first input/output optical waveguide pair disposed at the input side of said multistage Mach-Zehnder interferometer type optical circuit; and optimizing the individual phase control signals of said phase control means to achieve a desired characteristic of the output light from said multistage Mach-Zehnder interferometer type optical circuit based on the correlations between the phase control signals and output light intensity obtained for said symmetrical Mach-Zehnder interferometers and said asymmetrical Mach-Zehnder interferometers.

* * * * *

UNITED STATES PATENT AND TRADEMARK OFFICE
CERTIFICATE OF CORRECTION

PATENT NO. : 6,975,781 B2
APPLICATION NO. : 10/614637
DATED : December 13, 2005
INVENTOR(S) : Koichi Takiguchi and Senichi Suzuki It is certified that error appears in the above-identified patent and that said Letters Patent is hereby corrected as shown below:

Column 1
Line 26, after "interferometers" insert --,--

Column 8
Line 15, change "abd" to --and--
Line 15, boldface reference numerals "10" and "11"

Column 13
Line 53, change "effect" to --affect--

Column 14
Line 44, change "its both" to --both of its--

Column 15
Line 11, remove bold facing from "1"
Line 18, remove bold facing from "2"
Line 32, remove bold facing from "2" and "1"
Line 35, remove bold facing from "2"
Line 37, remove bold facing from "1"
Line 38, remove bold facing from "1"
Line 40, remove bold facing from "2"
Line 42, remove bold facing from "1"

Column 22
Line 46, change "oath" to --path--
Line 57, change "an" to --and--

Signed and Sealed this

Sixteenth Day of January, 2007

JON W. DUDAS
*Director of the United States Patent and Trademark Office*